United States Patent [19]
Slocum

[11] Patent Number: 5,466,071
[45] Date of Patent: Nov. 14, 1995

[54] HIGH SPEED HYDROSTATIC SPINDLE DESIGN

[75] Inventor: Alexander Slocum, Concord, N.H.

[73] Assignee: Advanced Engineering Systems, Operations & Products, Inc., Concord, N.H.

[21] Appl. No.: 209,384

[22] Filed: Mar. 10, 1994

[51] Int. Cl.⁶ .................................................. F16C 32/06
[52] U.S. Cl. ........................... 384/118; 384/111; 384/315
[58] Field of Search .................................... 384/118, 111, 384/114, 107, 192, 286, 315

[56] References Cited

U.S. PATENT DOCUMENTS

| | | | |
|---|---|---|---|
| 3,717,392 | 2/1973 | Ennis | 384/111 |
| 4,371,216 | 2/1983 | Suzuki et al. | 384/118 |
| 4,710,035 | 12/1987 | Vaughn | 384/118 |
| 5,281,032 | 1/1994 | Slocum | 384/118 |

*Primary Examiner*—Lenard A. Footland
*Attorney, Agent, or Firm*—Rines & Rines

[57] ABSTRACT

A novel means for the design of the pockets of a hydrostatic spindle and the flow supply, collection, and pocket injection means to allow for very high speed rotation with a minimum of heat generation, mid maximum load capacity; furthermore the concept of self compensation is used to make the design insensitive to contaminants and thereby allow for the use of water based hydrostatic fluids, whereas the design of the compensator region is also advanced to facilitate high speed use. Accordingly, the present invention allows designers to increase the allowable speed and accuracy of rotary motion hydrostatic bearings. Design methodologies are presented for designing self compensating hydrostatic bearing spindle pockets and compensators to minimize the effects variation in stiffness with angular position, cavitation in bearing pockets, and turbulent shear power generation. Although it may seem that these are unrelated effects, the design solutions required substantially overlap and are thus presented together here. The primary issue in all of the design advancements is that the flow must be kept from separating, which will induce cavitation. This will result in wear and erosion of the bearing surfaces which will lead to bearing failure. Cavitation is prevented by the use of gently changing shapes, and the introduction of pressure at locations in the bearing where left to itself, the flow would separate and create a low pressure cavitating region.

16 Claims, 4 Drawing Sheets

HIGH SPEED HYDROSTATIC SPINDLE DESIGN

The present invention relates to bearings that are supported by a thin film of pressurized fluid-liquid or gaseous-but preferably water or the like, being more particularly though not exclusively directed to hydrostatic bearings useful for rotary spindles and the like suitable for very high speed rotation with a minimum of heat generation, and maximum load capacity; and exemplifying the concept of self compensation to make the design insensitive to contaminants and thereby allow for the use of such water based hydrostatic fluids.

Accordingly, the present invention allows designers to increase the allowable speed and accuracy of rotary motion hydrostatic bearings. Design methodologies are presented for designing self compensating hydrostatic bearing spindle pockets and compensators to minimize the variation in stiffness with angular position, cavitation in bearing pockets, and turbulent shear power generation, which though different effects, necessitate design solutions that require substantial overlap and are thus presented together here, the primary issue being the flow must be kept from separating, which otherwise will induce cavitation, resulting in wear and erosion of the bearing surfaces and leading to bearing failure.

BACKGROUND

Hydrostatic bearings have been in use for a very long time, and recent improvements in compensator design, such as discussed in U.S. Pat. Nos. 5,164,237 and 5,281,032 provided means to allow water (or similar water-derived or related fluids herein generically referred to as 'water') to be used as a working fluid for the bearings. However, although water is an ideal fluid from a heat transfer perspective, and for reducing the shear forces on the spindle, its lower viscosity makes it more likely to cause turbulent flow. When a flow becomes turbulent, it causes greater viscous shear losses, and the power rate increase with speed can actually rise. In the past, when oil was used, flows rarely became turbulent and because of the high viscosity of oil, they still generated far too much heat to be used at high speeds which might give rise to turbulence.

Now with the use of water made possible by the above-cited patents, high laminar speeds can be obtained reasonably, and indeed, even when the flow becomes turbulent, it still only generates half the shear losses of oil. The present invention is concerned with major advancements in optimizing the shape of the bearing regions most effectively to handle high speed water flow which by its nature and the nature of wanting to run spindles fast, creates a need to run the bearings in a turbulent state. As will also later be shown, the designs for turbulence, also make the bearing more robust and more accurate even when they are run with oil or in the non turbulent state.

The present invention allows designers to increase the allowable speed and accuracy of rotary motion hydrostatic bearings. Design methodologies are presented for designing self compensating hydrostatic bearing spindle pockets and compensators to minimize the effects variation in stiffness with angular position, cavitation in bearing pockets, and turbulent shear power generation. Although it may seem that these are unrelated effects, the design solutions require substantial overlap and are thus presented in combination for optimal results.

The key factor is that the flow must be kept from separating, which will induce cavitation. This will result in wear and erosion of the bearing surfaces which will lead to bearing failure. Cavitation is prevented by the use of gently changing shapes, and the introduction of pressure at locations in the bearing where if otherwise left to itself, the flow would separate and create a low pressure cavitating region.

OBJECT OF THE INVENTION

Accordingly, it is an object of the present invention to provide new and improved bearing designs for fluid handling regions of hydrostatic bearings that are used primarily for supporting high speed or high accuracy rotating spindles and the like, although the same designs can apply to linear hydrostatic bearings to allow them to be made more efficient and to miniaturize them. Other and further objects are hereafter explained and more particularly delineated in the appended claims.

SUMMARY

In summary, there is provided a hydrostatic bearing assembly comprising a cylindrical shaft and a concentrically surrounding bearing housing that transfers radial forces, without mechanical contact, between the said shaft and the housing by two pairs of opposed pressurized bearing pockets of fluid filling the gap there between wherein the fluid flow to a cylindrical bearing pocket on one region of the shaft is regulated by a bearing cylindrical compensation section located at a region of the shaft opposite to said pocket, such that displacements of the bearing caused by applied loads cause the bearing gap to decrease in the region of said pocket, in turn causing the bearing gap to increase in the region of said fluid flow compensation section; said compensation section comprising a central aperture region that is connected to said pocket and is coplanar with a land region that surrounds said central aperture region, said pocket being surrounded by grooves having gradually sloped side walls and which are connected to a fluid pressure source, and in which the connection from said compensation section to said pocket, is made at an angle that directs the flow in a direction substantially tangent to the said shaft and generally in the direction of the surface velocity vector of said shaft.

Preferred and best mode designs are hereinafter described.

DRAWINGS

The invention will now be described with reference to the accompanying drawing in which.

Figure 6:
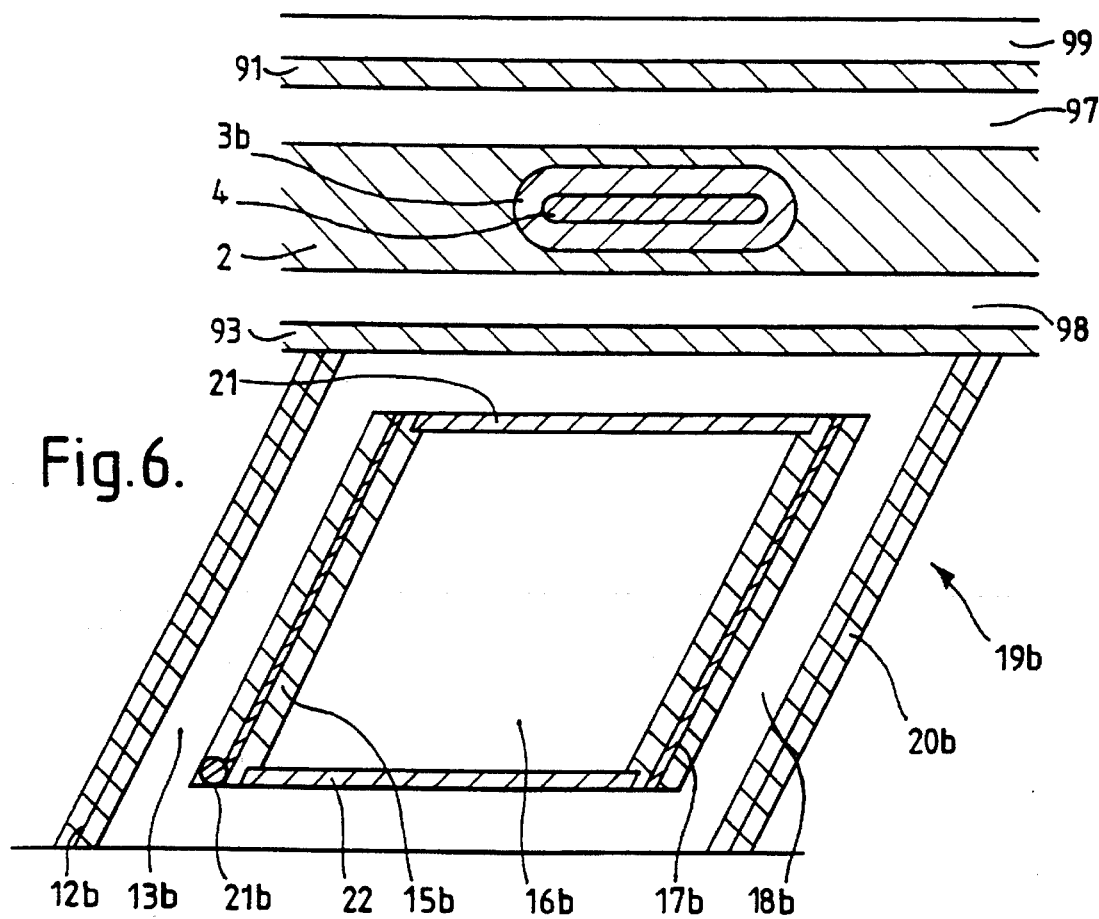
Figure 7:
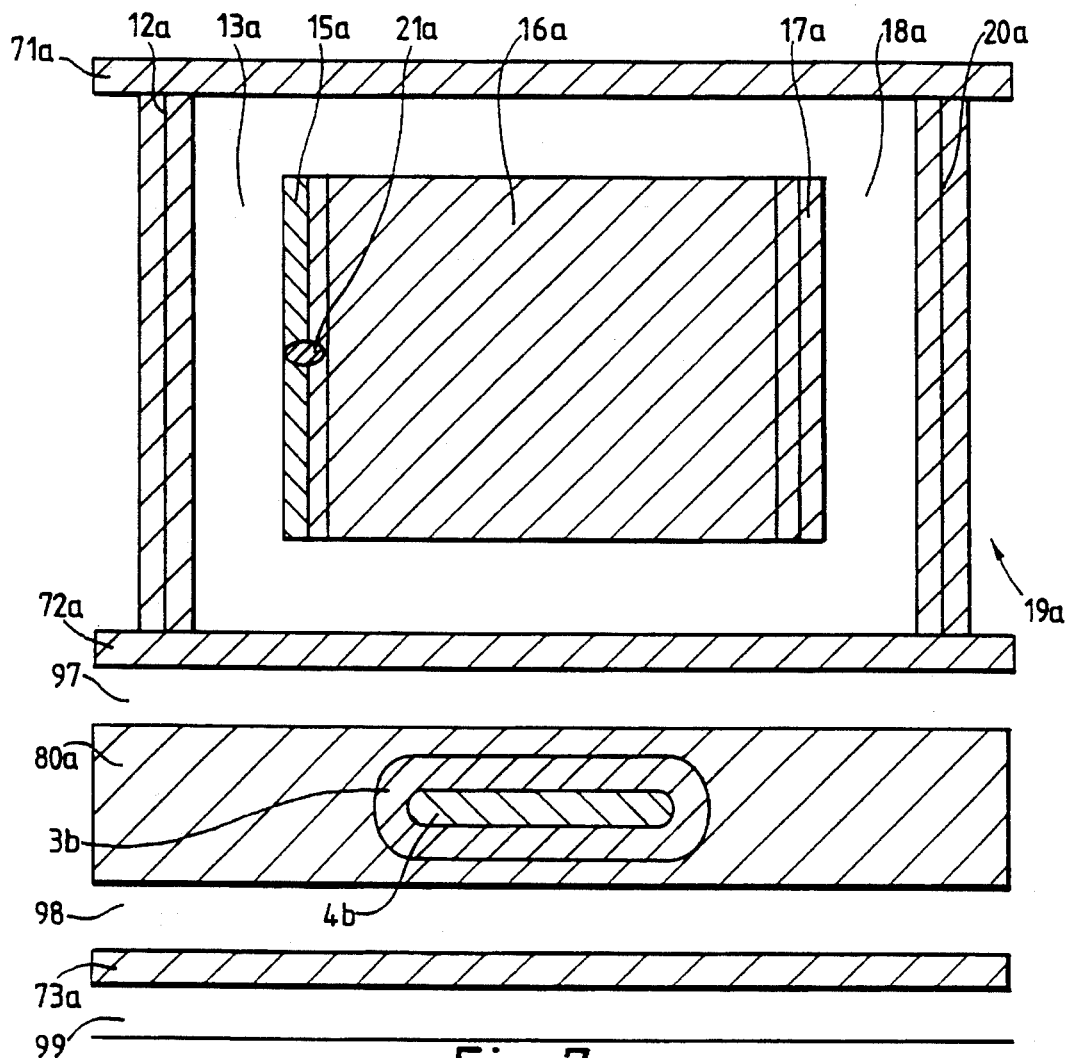
Figure 8:
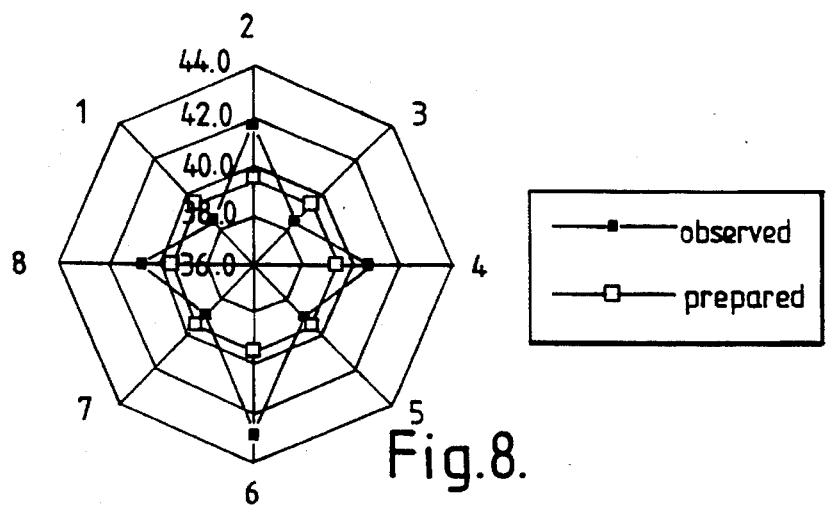
Figure 9:
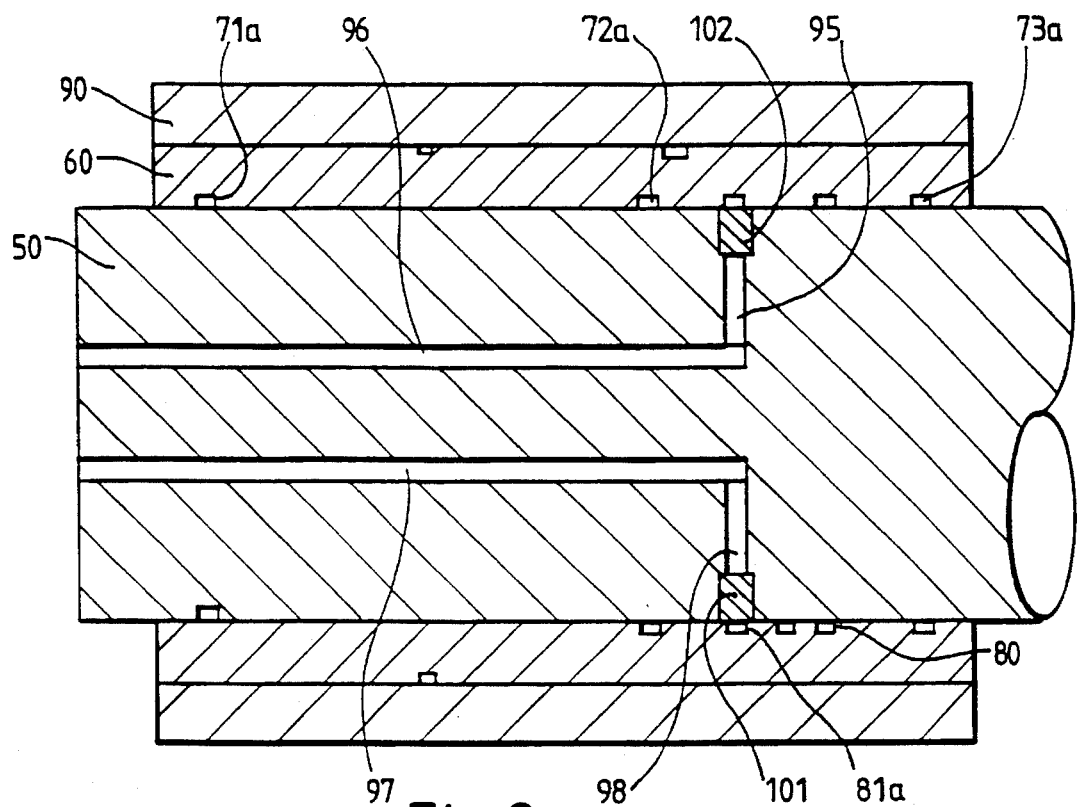
Figure 10:
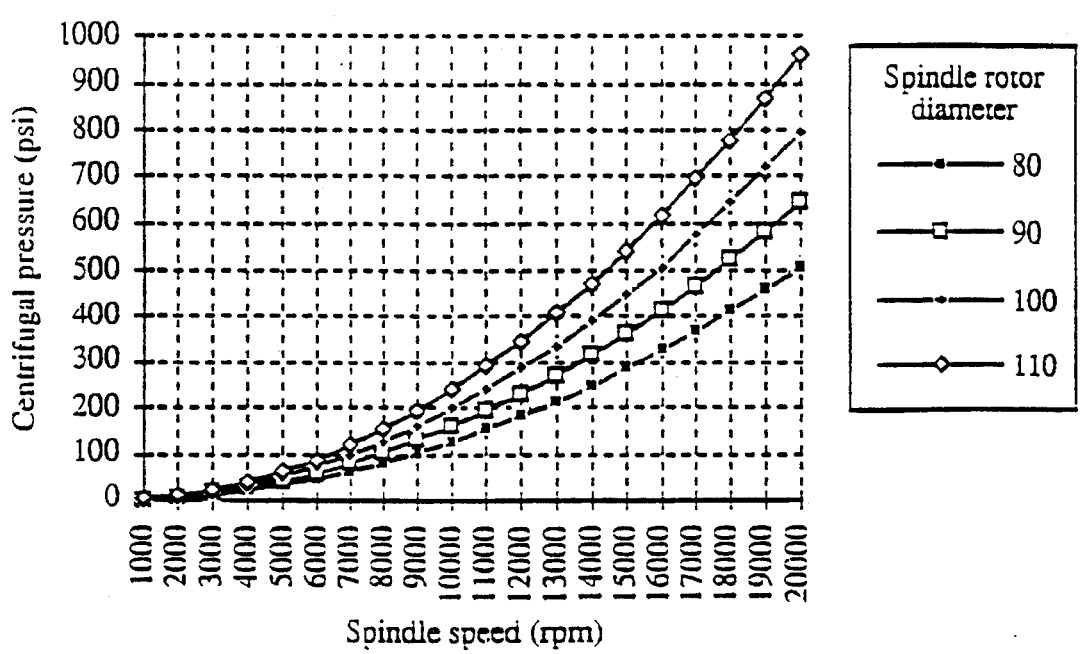

FIG. 6 is a top view of a single pocket region of what could be a many pocketed bearing, wherein the figure shows how the pocket region can be skewed to form a rhombus shape such that the pockets would therefore overlap to provide a more uniform stiffness profile for the bearing, and the angled grooves would actively channel the water at high speed which would help to prevent turbulence and cavitation in the grooves, FIG. 7 is a top view of a single pocket region of what could be a many pocketed bearing, wherein the figure shows how the pocket region can be of a conventional rectangular form also, but would take advantage of the central pocket region not being depressed but surrounded by the gradual-sloped grooves, FIG. 8 is a polar plot of the radial stiffness profile of a self compensating hydrostatic bearing that shows the lobed stiffness effect of using conventional rectangular pockets;

FIG. 9 is a cross section of a spindle system where radial holes bleed some of the high pressure fluid from the high pressure supply to axial holes in the rotor to provide high pressure coolant to a tool (not shown) that would be held to the spindle rotor by a standard means known to those skilled in the art;

FIG. 10 shows a plot of coolant pressure at the center of a shaft as a function of rotor radius and speed.

THE INVENTION

In general, a precision hydrostatic bearing supported spindle is manufactured from a housing, which bolts to the machine, a set of sleeves that contain the hydrostatic fluid flow control logic that are pressed in to the housing, and a rotating shaft that fits inside the sleeves with a small clearance, typically from 5–50 microns depending on the size of the unit and the pressure and viscosity of the fluid and the speed of the spindle. A hydraulic pump supplies fluid to the bearings, and a motor turns the spindle rotor.

There are five distinct, but performance coupled components to the present invention:

1) In a self compensating system, such as described in before-mentioned patents wherein the collector groove of tile self compensation system has, instead of a hole at one end, a longitudinal slit along the length of the collector groove to pass through the sleeve and connect with a groove on the OD of the sleeve to deliver the fluid to the opposed pocket; and for very high speed, the collector is wedge shaped also with tile center region machined out through the sleeve to encourage the fluid to be collected smoothly and then in effect be rammed into the passage which would then take it to the opposed pad.

2) In a hydrostatic bearing system, wherein the bearing pad comprises an annular land region that encircles a central pocket region, the central region is not a uniform depressed pocket, but rather a plateau of the same height as the surrounding land region, coplanar therewith, and the center plateau is surrounded by a channel that maintains the pressure of the plateau at a high level as would normally exist in a fully pocketed region.

3) In a hydrostatic bearing system wherein the channel that surrounds the central region is substantially deeper than tile center region, so the flow into the channel, preferably by the tangential injection means described in the before-mentioned patents, evenly keeps tile pressure in the central region high, and where tile channel is preferably shaped to have gradually sloped sides, such as a vee channel, to minimize the possibility of turbulence and cavitation when the fluid dragged by the rotor breaks over the edge of the channel.

4) In a hydrostatic bearing system where the bearing pads are normally rectangular in shape, the bearing pads of this invention are preferably rhombus shaped so that portions of the pads overlap and thereby accomplish two goals: decreased radial stiffness variation with circumferential position, and increased ease of distribution of flow at high speeds because the angled pockets encourage the flow to spread evenly from even a single entry point or a slit that covers the leading edge, as opposed to a rectangular pocket where a single point injection tends to causes the flow to fan out thus leaving some regions of the pocket to be at lower pressure than others, particularly at high speed.

5) Since high pressure water is used in the spindles to support the bearings, while high pressure water is often used as a coolant for the cutting process, then the same supply can be used for both if the spindle rotor has radial holes cut in it that intersect the region of the bearing where high pressure surrounds the compensators, said radial holes intersect axial holes which are positioned along the rotor to deliver the high pressure coolant to the tip of the tool.

Figure 1:
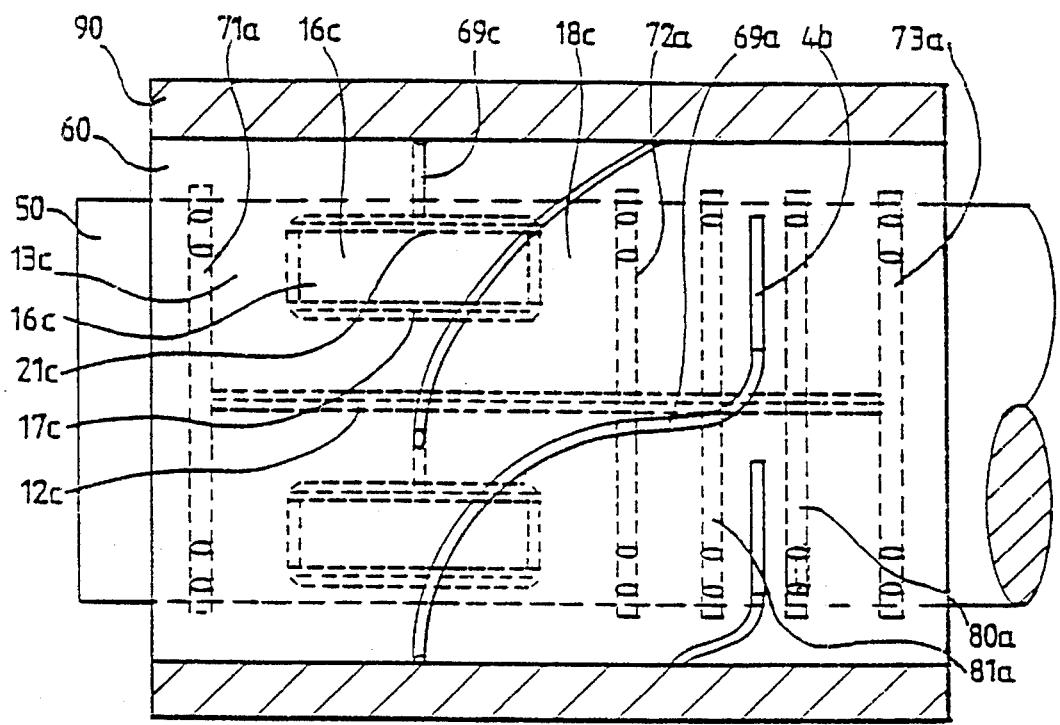
FIG. 1 is a cross section view through a spindle where the rotor is supported by self compensated hydrostatic bearings made from a sleeve with the geometry features cut in the ID and OD of the sleeve and then the sleeve is pressed into a bore of a housing.

To describe the overall configuration of a typical spindle system that could use the improvements described herein, FIG. 1 shows a cross section view through a spindle where the rotor shaft is supported by self compensated hydrostatic bearings made from a sleeve 60 with the geometry features cut in the ID and OD of the sleeve and then the sleeve is pressed into a bore of a housing 90. Grooves 71a, 72a, and 73a are for collecting water as it flows out of the spindle, and thus they are collected to drains. Grooves 80a and 81a would be connected to an external high pressure water system. High pressure fluid from these grooves flows across the space between them and into the collector grooves such as 4b. This groove is similar to the groove 4b shown in FIG. 2, but in FIG. 1, the backside of the groove is shown which is connected to a helical groove 69a that is machined on the OD of the sleeve 60. This groove would be connected to a hydrostatic pocket such as 15b in FIG. 6 via a connecting hole 21b. In FIG. 1, a similar connecting from a helical groove on the backside of the spindle would be hole 69c that connects to the leading edge of the gently sloped groove 21c to supply fluid to the pocket 21c. Fluid flows across the pocket and out the lands 13c and 18c to flow out the drain grooves 71a and 72a. Fluid that flows all the way across the pocket flows into groove 17c.

Figures 2A, 2B, 2C:
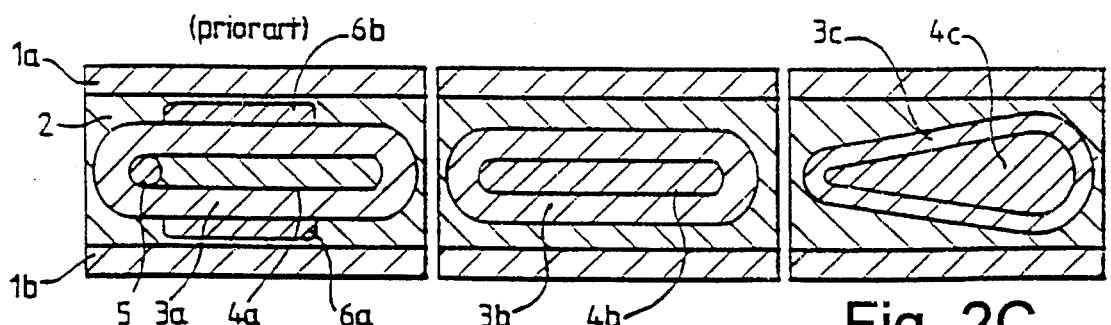
FIG. 2 is a top view of a portion of the compensation region of a self compensating bearing that illustrates three types of compensator units, one (A) of the traditional prior art type, and the others of novel through-slit high speed narrow profile type (B), and a slit-wedge shaped collector type (C)

To proceed with the discussion of features that make the subject invention amenable to very high speed rotation, consider FIG. 2 which is a top view of a portion of the compensation region of a self compensating bearing that illustrates for purposes of comparing side-by-side three types of compensator units, one labeled A of the traditional prior-art type, and the unit B showing a novel through-slit high speed narrow profile type, and the unit C a novel slit-wedge shaped collector type, these showing just a portion of the hydrostatic bearing unit more completely detailed in FIG. 6, actually residing next to a hydrostatic pocket, supplying fluid to the pocket opposite to its neighboring pocket. Thus this forms the feedback loop characteristic of self compensating hydrostatic bearings described in the previously cited patents. Returning to FIG. 2, lands $1a$ and $1b$ contain the high pressure fluid that is input to the channel 2 from slits $6b$ and $6a$. Slits or angled entrance holes help to reduce turbulence. A traditional self compensator has a land region $3a$ and a central collector groove $4a$. The fluid rushes to one end of the groove where it goes down a hole 5 and to a helical groove on the backside of the sleeve, such as 60 in FIG. 1, and to the opposing bearing pocket. The issue is that at high speed, large recirculating flows occur in the groove $4a$ which inhibit flow into the hole 5. To solve this problem, in accordance with the invention, the lands $3b$ surround a groove $4b$ which is actually a slit cut all the way through the sleeve. This allows the fluid to fall into the helical groove on the back of the sleeve, as soon as it enters the pocket. Thus at high speeds, the flow is far more effectively collected. Also, this helps to allow the compensator width to be minimized, because a 1 mm wide slit 20 mm long can handle the same flow as a 5 mm diameter hole. Another novel design option shown in FIG. 2C is that of a wedge shaped compensator wherein the lands $3c$ are shaped like a wedge, and the entire central region $4c$ is hollowed out to connect with the helical groove on the backside of the sleeve. This type of compensator can run at very high speed and act to collect the fluid most efficiently, but is generally used for spindles that have direction in one direction, such as a grinder spindle.

Figures 3A, 3B:
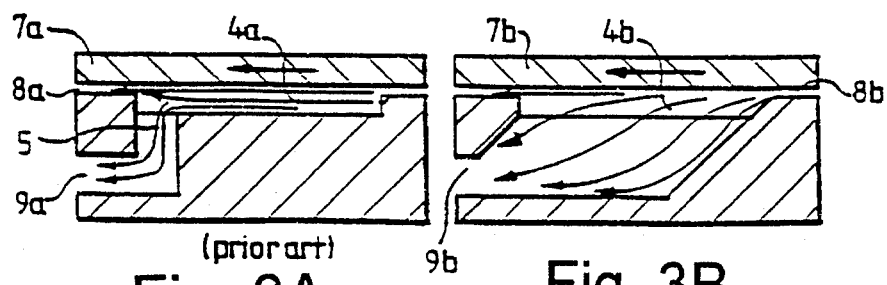
FIG. 3 is a side cross section view of the old and new types of compensator types, where the old type shows how fluid has difficulty entering the hole at high speed while the new type channels the fluid into the slit.

In order more fully better to illustrate why the cut-through slit is a better design then a simple hole, consider FIG. 3 which is a side cross section view of the old and new types of compensator types, where the old type (A) shows how fluid has difficulty entering the hole at high speed while the new type (B) channels the fluid into the slit. In FIG. 3A, the fluid is being dragged in the gap $8a$ between the rotor surface $7a$ and the compensator, where it enters the groove region $4a$. At the end of the compensator, some of the fluid goes down the hole 5 and into the helical channel $9a$, but much of it gets rammed out through the gap $8a$. The through-slit compensator B, on the other hand, has the spindle rotor $7b$ dragging the fluid through the gap $8b$ and into the slit $4b$ where it has a long space to be directed toward the helical groove $9b$ which takes the fluid off to an opposed pocket. All of the through-slit compensators would also be very useful for linear bearings as well, where the size of the compensator needs to be minimized, for example in a narrow profile bearing that is intended to be compatible with modular linear motion ball bearing units and thus have extreme space restrictions.

Figure 4:
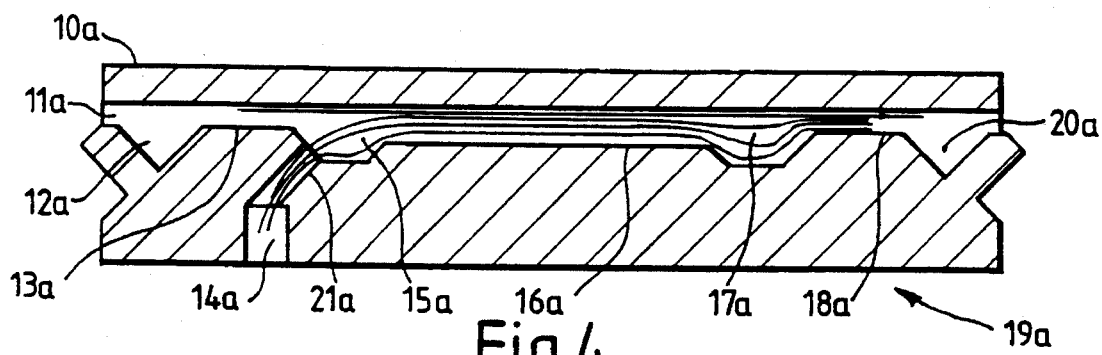
FIG. 4 is a cross section of a hydrostatic bearing pocket with a depressed central pocket and further depressed grooves surrounding the pocket to prevent cavitation and to provide an even flow field at the leading edge of the central pocket region.

Once the fluid is collected from the compensators and taken to the pockets, the manner in which it enters the pockets is also very important. FIG. 4 shows a type of pocket $19a$ that would be used for non-turbulent flows in the pocket, but care must be taken from inciting turbulence at the leading edge of the pocket. Thus as the rotor $10a$ drags the fluid across the gap $11a$ and it encounters drain groove $12a$ which has gently sloped sides, the flow is less likely to separate, as it would if the groove $12a$ had a rectangular profile, and then it channels into the pocket region. The fluid then is dragged across the land $13a$ and the fluid encounters the gently sloped fluid distribution groove $15a$ which is deeper than the central pocket region $16a$. The groove being sloped and deeper encourages the high pressure fluid from the compensator via groove $14a$ that is entering the pocket via hole $21a$ to be evenly distributed across the face of the central pocket region $16a$. This high pressure line of fluid also minimizes the potential for cavitation. After the fluid flows across the central pocket region $16a$, it encounters the other side of the groove system, the gently sloped depressed groove $17a$. This groove may also have an entrance hole to it from the compensator to allow for bi-directional rotation of the spindle. The fluid then is gently directed by the gentle slope to flow over the land $18a$ and out the bearing, where it would leave the bearing via the gently sloped drainage groove $20a$.

Figure 5:
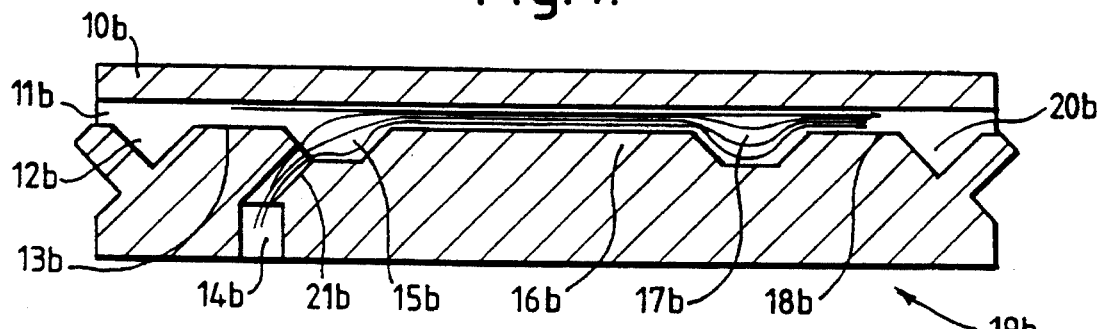
FIG. 5 is a cross section of a hydrostatic bearing pocket with a central pocket region with an elevation equal to that of the surrounding bearing lands and gradually sloped shaped grooves surrounding the pocket to prevent cavitation and to provide an even flow field around the central land region.

For a very high speed design where the fluid will be turbulent no matter what the pocket depth is, it is actually advantageous to use a design $19b$ shown in FIG. 5. Here once the fluid is collected from the compensators and taken to the pockets via groove $14b$, the manner in which it enters the pockets is also very important. FIG. 5 shows a type of pocket $19b$ that would be used for turbulent flows in the pocket. As the rotor $10b$ drags the fluid across the gap $11a$ and it encounters drain groove $12b$ which has gently sloped sides, the flow is less likely to separate, as it would if the groove $12b$ had a rectangular profile, and then it channels into the pocket region. Here the fluid encounters the gently sloped fluid distribution groove $15b$ which is deeper than the central pocket region $16b$ which is actually at the same elevation as the lands $13b$ and $18b$. The groove being sloped and deeper encourages the high pressure fluid from the compensator via groove $14b$ that is entering the pocket via hole $21b$ to be evenly distributed across the face of the central pocket region $16b$. This high pressure line of fluid also minimizes the potential for cavitation. The fluid in the region $16b$ is turbulent, but unlike viscous flow where the shear stress is proportional to the speed and the pocket depth, which is why non turbulent bearings use deep pockets, a turbulent flow shear stress is dependent on the gap-based Reynolds number, and hence the pocket is typically greater than 3 mm deep. It is better to have the pocket have no depth. This also greatly increases the squeeze film damping effect, and also gives a large hydrodynamic lift at higher speeds. Thus this design yields an incredibly high dynamic stiffness. After the fluid flows across the central pocket region $16b$, it encounters the other side of the groove system, the gently sloped depressed groove $17b$. This groove may also have an entrance hole to it from the compensator to allow for bi-directional rotation of the spindle. The fluid then is gently directed by the gentle slope to flow over the land $18b$ and out the bearing, where it would leave the bearing via the gently sloped drainage groove $20b$.

In this new invention, the center region of the pocket is no longer depressed the way conventional pockets are, but rather it has the same elevation as the surrounding land region. This gives the spindle very high squeeze film damping and shock overload resistance by virtue of the existence of a small gap between the raised central portion and the rotating rotor; thus when a load is suddenly applied, the fluid cannot be instantaneously squeezed out and the fluid film prevents the rotor from coming in physical contact with the bearing housing. This concept has been utilized in linear bearings, but was always thought to be bad for spindles because the small gap would generate increased viscous shear forces. Indeed, while this may be true for oil, for low viscosity water in spindles operated at speeds that compete with ball bearings, turbulence in the pocket would generate more heat than if the pocket did not have any increased depth. The concept here is to keep the central portion of the pocket at the same coplanar elevation as the bearing lands and to surround it with a vee shaped groove that prevents turbulence and cavitation in the spindle, which keeps the central region being held at a high pressure to support a load applied to the shaft.

Now that it has been established how the fluid is best collected by the compensators and then distributed to the pockets, FIG. 6 illustrates how the pockets themselves can be shaped to enhance the uniform flow of fluid and discourage cavitation and turbulence that would cause erosive wear. FIG. 6 is a top view of a single pocket region of what could be a many pocketed bearing, wherein the figure shows how the pocket region 16b is skewed to form a rhombus shape such that the pockets in a multi-pocket bearing would therefore overlap to provide a more uniform stiffness profile for the bearing, and the angled grooves 15b and 17b and side grooves 22 and 21 would actively channel the water that enters them from hole 21b at high speed, which would help to prevent turbulence and cavitation in the grooves. These grooves surround the central non-depressed pocket region 16b and thus act to hold it at the high pressure as indicated by the opposed compensator to the pocket. In this design, the central pocket region 16b is also at the same elevation as the bearing lands 13b and 18b as in FIG. 5. FIG. 6 also shows the other attributes of the system that were indicated in FIG. 1. Here there are drain grooves 91 and 93, and leakage prevention lands 97 and 98 and a pressurized groove 2 to supply the compensators. The pressurized fluid flows across the compensator land 3b and into the through-slit collector 4b to be taken by an unshown helical groove on the back of the bearing sleeve to a pocket that is geometrically opposed to the pocket 16b.

The rhombus shaped pockets could be easily made using the ElectroDischarge Method (EDM), which is a implemented on common EDM machines. However, in some cases, for simplicity and lower speeds, it may be desirable to use a standard rectangular pocket as shown in FIG. 7. Here there are similar features as found in FIG. 6. There is an external leakage land 99, and drain grooves 73a, 72a, and 71a. There is a pressure groove 80a and leakage prevention lands 97 and 98. The high pressure fluid in the fluid supply groove 80a flows across the compensator lands 3b and into the through-slit collector 4b to be channeled into a helical groove on the OD of the bearing sleeve that would be taken to a pocket opposite to pocket 16a. Fluid from the pockets leaves the bearings via drain grooves 71a, 12a, 20a, and 72a, which help to maximize the pocket pressure differential in the bearing. This results in much greater flow through this type of bearing, than through bearings that do not use drains grooves between the pockets, but it results in much greater differential pocket pressures which increases the load capacity of the bearings. The high pressure fluid from the compensator enters the bearing region via hole 21 the fluid flows across the centrally depressed pocket region 16a, which note does not need side grooves 21 and 22 as does the non depressed pocket region in FIG. 6. The fluid comes to the end of the pocket region 16a and may then encounter a channel 17a which is also gently sloped if the bearing is to be bi-directional, or if the bearing is unidirectional, as for a grinder, then the groove 17a can be eliminated to reduce cost. If this is the case, then the end of the pocket region 61 a must be gently sloped, and which may actually feed a fan-shaped slit at the leading edge of the deep gently sloping edge groove 15a.

To illustrate the effect of a non-rhombus pocket, FIG. 8 shows a polar plot of the radial stiffness profile of a self compensating hydrostatic bearing that shows the lobed stiffness effect of using conventional rectangular pockets. If rhombus pockets were used, then this effect would be reduced by 50% or more. This would yield greater spindle accuracies.

Thus in summary, the invention concerns the shaping of the pockets in a manner quite unlike any previous design for hydrostatic bearing pockets, where in the new invention the center region of the pocket is no longer depressed the way conventional pockets are, but rather it has the same elevation as the surrounding land region, thereby granting the spindle very high squeeze film damping and shock overload resistance by virtue of the existence of a small gap between the raised central portion and the rotating rotor. Furthermore, to maintain high hydrostatic pressure over this central region of the pocket, it is surrounded by a groove that has sloped sides that minimize the chance of flow separation and cavitation that could otherwise erode the pockets, and thus since the central region is at a small gap and it is surrounded by a smooth gently sloped groove, turbulent flow, which will happen at high speeds particularly when water is used, will cause far less drag forces than if a deep pocketed highly turbulent flow design were used. In addition, the pocket may be shaped like a rhombus, so that adjacent pockets actually overlap, which increases accuracy and encourages the flow in the groove surrounding the pocket to flow around the central land region without causing recirculating flow patterns which lead to increased turbulence and erosive wear. Furthermore, the said surrounding groove is fed high pressure by self compensation means to support a loaded shaft, where the high pressure is delivered in proportion to the load on the shaft by means of a self compensation system where a zone of the bearing adjacent to the pockets surrounds compensation units by high constant pressure from a pump which flows across a land region that encloses a collector groove, or slit, that is cut all the way through the bearing sleeve that the pockets and compensators are manufactured into. The sleeve is shrink fit into a large housing to provide a good seal and therefore enclosing helical grooves on the back of the sleeve. Said slit that has been cut through connects to a helical groove that wraps around the back of the sleeve and then connects with a hole or a slit to the groove on the opposite side of the bearing that is surrounded by a drain groove region and an elevated land region. The groove itself then surrounds a central elevated region, which has the same elevation as the land region, so the central region is then at the same pressure as the pocket and hence supports the load on the shaft. Therefore when the rotor is turning and a load is applied, through cutting forces for example, the gap between the compensator and the rotor increases on one side of the rotor and decreases on the other side of the rotor, so more fluid flows into one compensator than the other, and the fluid flow to one pocket is greater than to the other and the differential pressure across the pockets acts to balance the load on the rotor. In the case when the rotor is spinning at a high rate, the fluid that flows into the compensator immediately falls into the slit and through the sleeve into the groove that takes it to the opposed pocket region. Thereby, with the use of the through-slit, the high speed rotor does not drag the fluid to the end of the collector groove at the center of the compensator where it would otherwise form an energy robbing pressure decreasing recirculating flow. Furthermore, and because the efficiency of the system is increased, it becomes plausible to increase the power of the pressure supply unit and allow for some of the high pressure fluid to bleed off through radial holes in the rotor and then for them to meet with axial holes that supply high pressure fluid to the tool held in the spindle, thereby obtaining integral through-the-tool cooling.

Depending on the degree of speed and load capacity desired and the cost that is to be spent, any or all of these design advances can be combined as desired.

Because water is being used as the hydrostatic fluid, and because water is also used as a cutting fluid, with appropriate additives, in many applications, it may be desirable to use the same fluid for the bearings and for the tools. This would minimize the cost of the spindle, because currently, ball bearing spindles use a very expensive coupling to provide the spindle with high pressure oil to lubricate the bearings under their races, and high pressure water based coolants to cool the tool and wash away chips. FIG. 9 shows a schematic cross section of a spindle system where radial holes 95 and 98 bleed some of the high pressure fluid from the high pressure supply groove 81a and 80a to axial holes 96 and 97 in the rotor 50 to provide high pressure coolant to a tool (not shown) that would be held to the spindle rotor by a standard means known to those skilled in the art. The spindle has the same construction otherwise as shown in FIG. 1, with a housing 90, sleeve 60 for the bearing logic to be machined in before being shrunk into the housing, and drain grooves 71a, 72a, and 73a.

The pressure (in metric units) at any inner and outer radius combination can be calculated from the following, where $\rho$ is the density of the fluid, $\chi$ is the speed, and $r_1$ and $r_2$ are the spindle OD and axial hole location radius respectively:

$$P_{available} = P_s - P_{centrifugal}$$

$$P_{centrifugal} = \frac{\rho(r_1^2 - r_2^2)\omega^2}{2}$$

FIG. 10 shows a plot of coolant pressure at the center of a shaft as a function of rotor radius and speed. If the coolant supply was 1500 psi, as is the case for a very high performance spindle where the bearing shear area is to be minimized to minimize shear power losses, and if the supply pressure groove was at a radius of 100 mm, then at 20,000 rpm, 950 psi would be used up by the centrifugal pressure generated. This would still leave a respectable 650 psi for the through the tool coolant system. Note that when the spindle is not turning, but the hydrostatics are on, coolant would be streaming out of the spindle. Thus it may be necessary in some instances to provide a centrifugal force activated valve 101 and 102 in FIG. 9 that only allow fluid into the tool at fairly high predetermined speeds.

Further modifications of the invention will also occur to persons skilled in the art, and all such are deemed to fall within the spirit and scope of the invention as defined by the appended claims.

I claim:

1. A hydrostatic bearing assembly comprising a cylindrical shaft and a concentrically surrounding bearing housing that transfers radial forces, without mechanical contact, between the said shaft and the housing by two pairs of opposed pressurized bearing pockets of fluid filling the gap therebetween wherein the fluid flow to a cylindrical bearing pocket on one region of the shaft is regulated by a bearing cylindrical compensation section located at a region of the shaft opposite to said pocket, such that displacements of the bearing caused by applied loads cause the bearing gap to decrease in the region of said pocket, in turn causing the bearing gap to increase in the region of said fluid flow compensation section; said compensation section comprising a central aperture region that is connected to said pocket and is coplanar with a land region that surrounds said central aperture region, said pocket being surrounded by grooves having gradually sloped side walls and which are connected to a fluid pressure source, and in which the connection from said compensation section to said pocket, is made at an angle that directs the flow in a direction substantially tangent to the said shaft and generally in the direction of the surface velocity vector of said shaft.

2. A hydrostatic bearing assembly as claimed in claim 1 and in which the shaft comprises a rotary spindle.

3. A hydrostatic bearing assembly as claimed in claim 2 and in which the said gap is sufficiently small to provide the spindle with a high squeeze film damping and shock overload resistance.

4. A hydrostatic bearing assembly as claimed in claim 3 and in which the said gradually sloped side walls are adjusted to minimize the chance of fluid separation and cavitation and produce less drag forces in response to flow turbulence.

5. A hydrostatic bearing assembly as claimed in claim 2 and in which said grooves are longitudinal slit openings.

6. A hydrostatic bearing assembly as claimed in claim 5 and in which the slit openings are of wedge shape.

7. A hydrostatic bearing assembly as claimed in claim 5 and in which helical grooves are provided around the back of a bearing surface sleeve with which the collector groove slits communicate through the bearing sleeve and which connects with a groove on the opposite side of the bearing.

8. A hydrostatic bearing assembly as claimed in claim 3 and in which the bearing pads, each comprising the central pocket region and an annular encircling land region, are of substantially rhombus shape so that portions of the pads may overlap to decrease radial stiffness variation with circumferential position and to cause more even fluid flow spread.

9. A hydrostatic bearing assembly as claimed in claim 2 and in which a common fluid supply is used for the spindle shaft cooling and bearing operation, with apertures formed in the shaft that intersect the region of the bearing where the high fluid pressure surrounds the compensation section.

10. A hydrostatic bearing assembly as claimed in claim 2 and in which the same is clustered in a head with one or more further similar hydrostatic bearing spindle assemblies.

11. A hydrostatic bearing assembly comprising a pair of opposing bearing surfaces, one bearing surface having opposed pressurized bearing pockets of fluid filling the gap between the surfaces wherein the fluid flow to a bearing pocket on one region of said one surface is regulated by a bearing compensation section located at a region opposite to said pocket, such that displacements of the said one bearing surface caused by the applied loads cause the bearing gap to decrease in the region of said pocket, in turn causing the bearing gap to increase in the region of said fluid flow compensation section; said compensation section comprising a central aperture region that is connected to said pocket, surrounded with a land region, said pocket being surrounded by grooves having gradually sloped side walls and which are connected to a fluid pressure source, and in which the connection from said compensation section to said pocket, is made at an angle that directs the flow in a direction substantially tangent to the said one bearing surface.

12. A hydrostatic bearing assembly as claimed in claim 11 and in which the bearing portions comprising the central pocket region and the surrounding land region are of substantially rhombus shape.

13. A hydrostatic bearing assembly as claimed in claim 11 and in which the said grooves are one of longitudinal slit and slit-wedge openings.

14. A hydrostatic bearing assembly as claimed in claim 11 and in which a common fluid supply is used for the bearing surface cooling and the bearing operation.

15. A hydrostatic bearing assembly as claimed in claim 11 and in which the bearing surfaces comprise a cylindrical shaft and a concentrically surrounding bearing housing.

16. A hydrostatic bearing assembly as claimed in claim 11 and in which the bearing surfaces comprise a pair of opposed linearly extending surfaces.

* * * * *